(12) United States Patent
Hofrichter

(10) Patent No.: US 12,033,773 B2
(45) Date of Patent: Jul. 9, 2024

(54) COMPONENT AND USE OF A COMPONENT

(71) Applicant: TDK Electronics AG, Munich (DE)

(72) Inventor: Alfred Hofrichter, Hartberg (AT)

(73) Assignee: TDK Electronics AG, Munich (DE)

( * ) Notice: Subject to any disclaimer, the term of this patent is extended or adjusted under 35 U.S.C. 154(b) by 101 days.

(21) Appl. No.: 17/612,337

(22) PCT Filed: May 26, 2020

(86) PCT No.: PCT/EP2020/064597
§ 371 (c)(1),
(2) Date: Nov. 18, 2021

(87) PCT Pub. No.: WO2020/244972
PCT Pub. Date: Dec. 10, 2020

(65) Prior Publication Data
US 2022/0310290 A1 Sep. 29, 2022

(30) Foreign Application Priority Data
Jun. 3, 2019 (DE) .......................... 102019114838.3

(51) Int. Cl.
*H01C 7/04* (2006.01)
*G01K 7/22* (2006.01)
(Continued)

(52) U.S. Cl.
CPC .............. *H01C 7/041* (2013.01); *G01K 7/22* (2013.01); *H01C 1/1413* (2013.01); *H01C 7/042* (2013.01); *H01C 7/18* (2013.01)

(58) Field of Classification Search
CPC ...... H01C 7/041; H01C 1/1413; H01C 7/042; H01C 7/18; G01K 7/22
See application file for complete search history.

(56) References Cited

U.S. PATENT DOCUMENTS 5,245,309 A * 9/1993 Kawase ............... H01C 17/006
338/22 SD
6,008,717 A * 12/1999 Kawase .................. H01C 1/14
338/21

(Continued)

FOREIGN PATENT DOCUMENTS

| CN | 102326214 A | 1/2012 |
| CN | 103456496 A | 12/2012 |

(Continued)

OTHER PUBLICATIONS

International Search Report and Written Opinion of International Searching Authority corresponding to International Patent Application No. PCT/EP2020/064597, mailed Oct. 30, 2020, with English tranlsation of International Search Report (20 pages).

*Primary Examiner* — Kyung S Lee
(74) *Attorney, Agent, or Firm* — Nixon Peabody LLP

(57) ABSTRACT

A component having an active volume, the active volume not being centrally positioned along a height of the component, and/or not being centrally positioned along a width of the component. Use of the component is also disclosed. Further aspects relate to a use of the component and to a component. The component can be an NTC thermistor or a PTC thermistor or a temperature measurement element. Use of the component for monitoring a temperature of a battery or in a vehicle is also disclosed.

18 Claims, 3 Drawing Sheets

(51) Int. Cl.
*H01C 1/14* (2006.01)
*H01C 7/18* (2006.01)

(56) References Cited

U.S. PATENT DOCUMENTS

| | | | | |
|---|---|---|---|---|
| 6,133,821 A * | 10/2000 | Nabika | ............... | H01C 7/18 |
| | | | | 338/25 |
| 6,717,506 B2 * | 4/2004 | Ishii | ............... | H01C 7/003 |
| | | | | 338/332 |
| 7,084,732 B2 * | 8/2006 | Krumphals | ............... | H01C 7/18 |
| | | | | 338/204 |
| 7,889,049 B2 * | 2/2011 | Ito | ............... | H01C 7/041 |
| | | | | 338/307 |
| 9,651,428 B2 * | 5/2017 | Erhart | ............... | G01J 5/028 |
| 2006/0279172 A1 * | 12/2006 | Ito | ............... | H01C 7/18 |
| | | | | 310/328 |
| 2009/0309691 A1 * | 12/2009 | Ito | ............... | H01C 7/18 |
| | | | | 338/22 R |
| 2010/0066482 A1 | 3/2010 | Shiko | | |
| 2010/0214054 A1 * | 8/2010 | Kobayashi | ............... | H01C 1/148 |
| | | | | 338/22 R |
| 2011/0298578 A1 | 12/2011 | Feichtinger et al. | | |
| 2013/0207770 A1 * | 8/2013 | Rinner | ............... | H01C 7/008 |
| | | | | 29/610.1 |
| 2013/0319742 A1 | 12/2013 | Ahn et al. | | |

FOREIGN PATENT DOCUMENTS

| | | |
|---|---|---|
| CN | 102903468 A | 1/2013 |
| DE | 4207915 A1 | 9/1992 |
| DE | 102009010212 A1 | 9/2010 |
| EP | 1679723 A1 | 7/2006 |
| JP | H02-189901 A | 7/1990 |
| JP | H05-243007 A | 9/1993 |
| JP | 2005340589 A | 12/2005 |
| JP | 2018-045858 A | 3/2018 |
| JP | 2018-206911 A | 12/2018 |
| WO | 2005043556 A1 | 5/2005 |
| WO | 2016143483 A1 | 9/2016 |

* cited by examiner

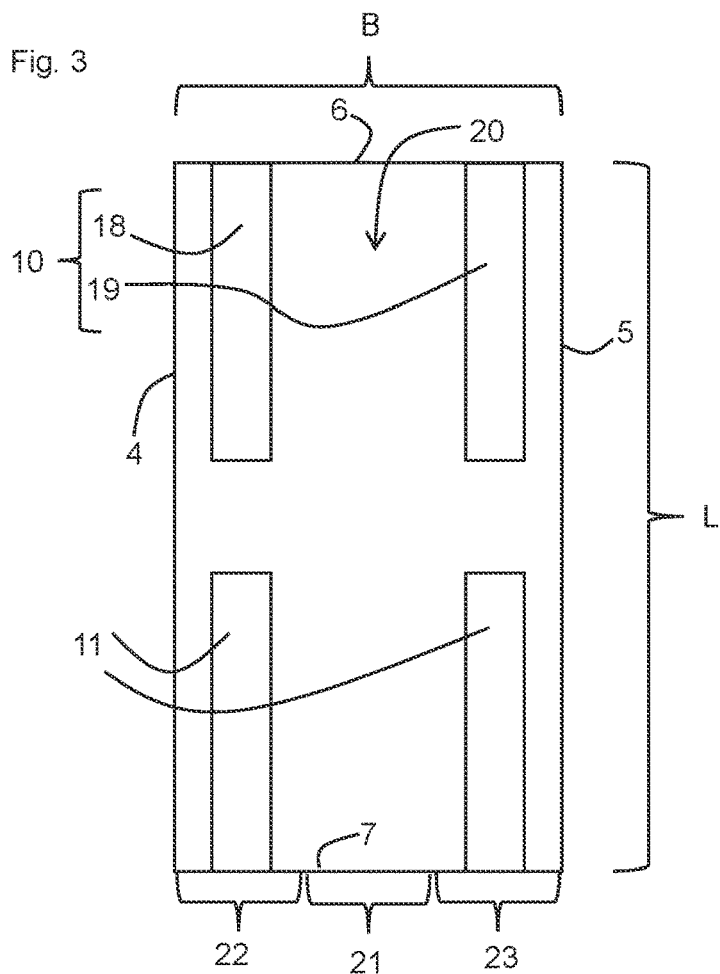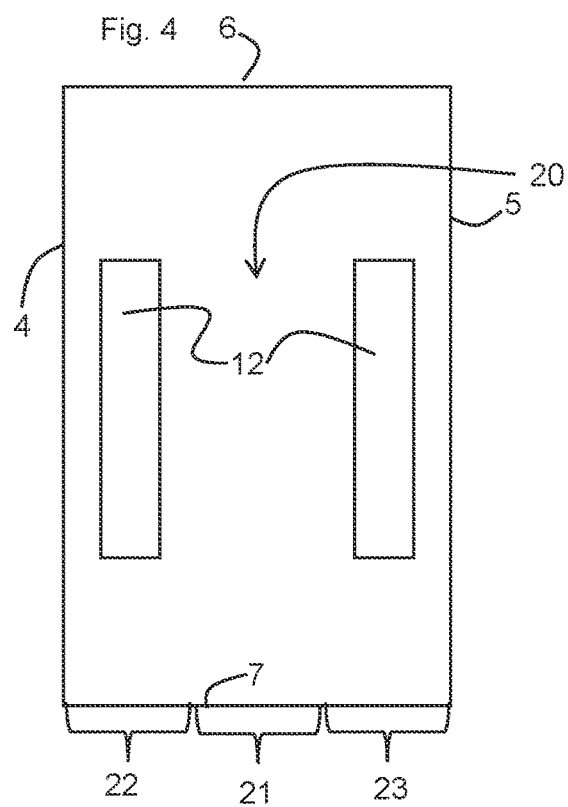

COMPONENT AND USE OF A COMPONENT

CROSS-REFERENCE TO RELATED APPLICATIONS

This application is a U.S. National Stage of International Application No. PCT/EP2020/064597, filed May 26, 2020, which claims the benefit of German Patent Application No. 102019114838.3, filed Jun. 3, 2019, both of which are incorporated herein by reference in their entireties.

FIELD

The present invention relates to a component, in particular to a ceramic multilayer component, for example an NTC thermistor for surface mounting. A further aspect relates to the use of the component.

SUMMARY

Components of this kind can be used, for example, in a temperature sensor as a temperature-sensitive element. In this case, an ambient temperature acts on the component, for example as radiant heat from above or via a printed circuit board from below. The ambient temperature can change the temperature of the component in this case. This can cause a change in the electrical properties of the component, for example the resistance, wherein the changes can be measured by a suitable electronics system.

For many applications, an extremely rapid response by the sensor is desired or required. The speed of the response by the sensor is described by the thermal time constant of the sensor. The thermal time constant indicates the time that the sensor takes to reach 63% (1−1/e) of the new temperature. The thermal time constant depends on external factors, for example the material on which the sensor is installed, the solder used, a quantity of solder and the environment. Sensor properties such as the size of the device or the type of material of the sensor also influence the thermal time constant.

The object of the present invention is then to specify an improved component, in particular a component which can allow its electrical properties to be influenced extremely rapidly when there is a change in an ambient temperature.

The object is achieved by a component according to claim 1. The dependent claims relate to advantageous refinements.

The invention proposes a component, wherein an active volume of the component is not arranged centrally over a height of the component. As an alternative or in addition, the active volume is not arranged centrally over a width of the component.

The active volume can be formed by overlap regions of adjacent inner electrodes of opposite polarity. As an alternative, the active volume can be formed by a region which is situated between two inner electrodes of opposite polarity, wherein the two inner electrodes are arranged in the same plane and do not touch each other.

The active volume can be made up of several partial regions in which inner electrodes that are adjacent in the stacking direction in each case overlap or in which inner electrodes in the same plane form an active volume. In this case, the overlapping inner electrodes can be directly adjacent to one another in the stacking direction.

Since the active volume is not arranged centrally over the width and/or the height of the component, the active volume is arranged close to an outer face of the component. A change in the ambient temperature causes a change in the temperature of the component which is exposed to this environment. A change in temperature of this kind can proceed inhomogeneously. In particular, the change in temperature of the component can take place from the outside to the inside. Accordingly, the temperature of the outer faces and the regions of the component that are close to the outer faces can be changed more rapidly than central regions of the component. As a result of the active volume being arranged in a region of this kind, the active volume can be rapidly influenced by the change in temperature. The active volume may be critical for the electrical properties of the component, for example the resistance of the component. Therefore, owing to the non-central arrangement of the active volume, the thermal time constant of the component can be reduced.

The height of the component can be an extent of the component in a stacking direction in which inner electrodes and ceramic layers are arranged one above the other. The inner electrodes can be planar and extend in a length direction and a width direction. The height can be an extent of the component in a direction that is perpendicular to the length direction and to the width direction.

The width of the component can be an extent of the component from a first side face to a second side face of the component, wherein the outer electrodes of the component are not arranged on the first or the second side face. In this case, the width can indicate the extent of the component in the width direction.

In particular, the active volume can be arranged close to a side face of the component, close to a bottom side of the component and/or close to a top side of the component.

The component can have inner electrodes, wherein inner electrodes that are adjacent to one another in a stacking direction overlap with one another in at least one overlap region, wherein the active volume of the component is formed by the at least one overlap region of the inner electrodes.

As an alternative, the component can comprise two inner electrodes which are arranged in one plane and are not in contact with one another, wherein a region between the inner electrodes forms the active volume of the component. In this case, one of the inner electrodes can be connected to a first outer electrode and the other of the inner electrodes can be connected to a second outer electrode.

The height of the component can extend from a bottom side of the component to a top side of the component. The active volume can be arranged in a lower region between the bottom side and a height of 30% of the height and/or in an upper region between a height of 70% of the height and the top side. The active volume is preferably arranged in a lower region between the bottom side and a height of 20% of the height H and/or in an upper region between a height of 80% of the height H and the top side.

If the active volume is arranged both in the upper and in the lower region, a symmetrical component is produced which, in the case of surface mounting, can be mounted both with the top side facing a printed circuit board and with a bottom side facing the printed circuit board, without the electrical properties of the component being changed. Components of this kind are often manufactured as bulk goods, and therefore symmetry in respect of the top and bottom side is advantageous.

The width of the component can extend from a first side face to a second side face of the component. The active volume can be arranged in a left-hand-side region between the first side face and a width of 30% of the width B and/or in a right-hand-side region between a width of 70% of the width B and the second side face. In this case, the active volume can be arranged in the left-hand-side region, which extends from the first side face as far as a width of not more than 30% of the width B, and/or in the right-hand-side region, which extends from the second side face as far as a width of at least 70% of the width B, wherein, in the width direction, a central region, which is free of inner electrodes, is arranged between the left-hand-side region and the right-hand-side region and directly adjoins the left-hand-side region and the right-hand-side region in each case.

The active volume can preferably be arranged in a left-hand-side region between the first side face and a width of 20% of the width B and/or in a right-hand-side region between a width of 80% of the width B and the second side face. As a result, it is possible to ensure that the active volume is arranged close to the side faces. A change in temperature, which runs from the outside to the inside across the component, can therefore rapidly reach the active volume. As a result, a reduced time constant can be produced.

At least one of the inner electrodes of the component can be a floating electrode. Further inner electrodes of the component can be connected to one of the outer electrodes of the component. A floating inner electrode is not in electrical contact with the outer electrode.

The active volume can have a plurality of partial volumes which are arranged symmetrically in relation to one another. Owing to a symmetrical arrangement of the partial volumes, it can be possible for the component to be installed in any desired position.

At least one inner electrode can have two parts which are separated from one another by a gap which runs perpendicularly to the height and to the width of the component. In this case, the two parts of the inner electrode can each be connected to an outer electrode, in particular to the same outer electrode. As an alternative, the inner electrode can also be a floating electrode, wherein both parts are floating. The gap can be arranged centrally in the width direction. Owing to the formation of the gap between the two parts of the inner electrode, the active volume can be offset in such a way that it is close to the side faces of the component. Accordingly, the active volume can be rapidly influenced by a change in temperature of the side face.

The active volume can make up less than 30% of a total volume of the component. The active volume can preferably make up less than 20% or less than 10% of the total volume. By virtue of such a small active volume, it may be possible for the temperature of the active volume to be able to be rapidly changed. A rapid sensor response in the event of a change in the ambient temperature can be ensured in this way.

The component can comprise a ceramic material with a high thermal conductivity. The high thermal conductivity of the ceramic material can contribute to a change in temperature rapidly reaching the active volume.

The component can comprise an outer electrode which is arranged on a third side face of the component. At least one of the inner electrodes can be connected to the outer electrode. The outer electrode can partially overlap the inner electrode that is connected to the outer electrode, wherein the inner electrode that is connected to the outer electrode projects beyond a region which is overlapped by the outer electrode. The outer electrode can partially overlap, for example, the top side and/or the bottom side. If the inner electrode projects beyond the outer electrode, the length of the outer electrode has only a slight influence on the resistance distribution of the component. In particular, a direct current flow between the outer electrodes can be avoided in this way.

The component may be a ceramic component. The component may be an electrical or electronic component. The component may be a multilayer component. The component may be a thermistor. The component may be an NTC thermistor or a PTC thermistor. The component may be a varistor. The component may be a temperature measuring element. The component may be configured for surface mounting.

According to a further aspect of the present invention, the above-described component can be used for monitoring a temperature of a battery. In a battery, it is critical to interrupt a charging process of the battery before the battery overheats since, otherwise, the battery could be damaged. If the component according to the invention is used for monitoring the temperature of the battery, overheating of the battery can be rapidly identified since the component has a low thermal time constant on account of the arrangement of the active volume. Accordingly, the component is particularly well suited to monitoring a temperature of the battery.

According to a further aspect, the component is used for monitoring a temperature in a vehicle. Vehicles have numerous regions in which temperature monitoring is important. For example, the temperature of a battery has to be continuously monitored in an electric vehicle.

Preferred exemplary embodiments of the present invention will be explained in more detail below with reference to the figures.

BRIEF DESCRIPTION OF DRAWINGS

FIG. 3 shows a cross section through a component according to a second exemplary embodiment, FIG. 4 shows another cross section through a component according to the second exemplary embodiment.

DETAILED DESCRIPTION

Figure 1:
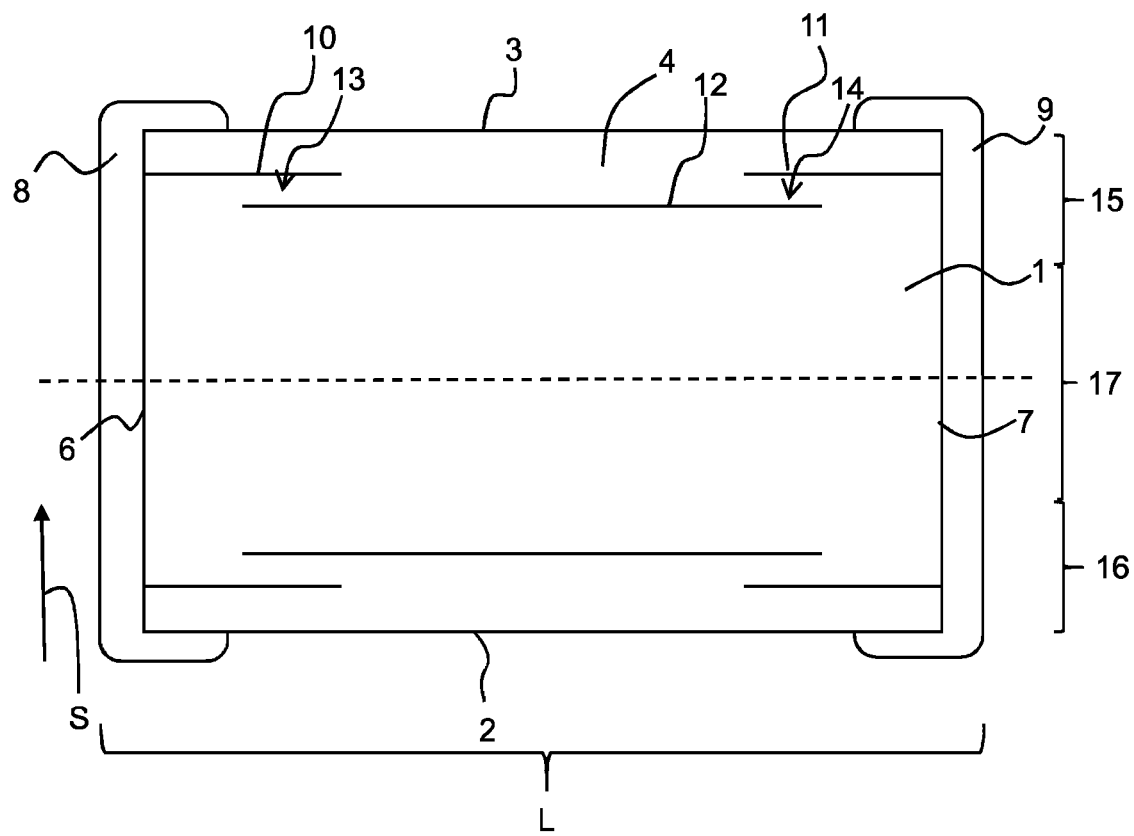
FIG. 1 shows a schematic cross section through a component according to a first exemplary embodiment.

FIG. 1 shows a schematic view of a cross section through a component. The component is a ceramic multilayer component. In particular, the component is an NTC thermistor (NTC=negative temperature coefficient). The component is intended to be surface mounted (SMD component, SMD=surface mounted device).

The component has inner electrodes and layers of a ceramic material 1. The inner electrodes and the ceramic layers 1 are arranged one above the other in a stacking direction S. The extent of the component in the stacking direction S is also referred to as the height H of the component. The height H extends from a bottom side 2 to a top side 3 of the component. The surface normals of the bottom side 2 and of the top side 3 each point in the stacking direction S. The inner electrodes are of planar design and are arranged parallel to the bottom side 2 and parallel to the top side 3 of the component.

The component is cuboidal. The component has a first side face 4, a second side face 5, a third side face 6 and a fourth side face 7 which are each perpendicular to the top side 3 and the bottom side 2. The first side face 4 and the second side face 5 are free of outer electrodes.

The component further has a first outer electrode 8 and a second outer electrode 9. The first outer electrode 8 is arranged on the third side face 6 of the component. The first outer electrode 8 in each case partially overlaps the top side 3 and the bottom side 2 of the component. The second outer electrode 9 is arranged on the fourth outer face 7 of the component. The second outer electrode 9 partially overlaps the top side 3 and the bottom side 2 of the component.

The extent of the component from the third side face 6 to the fourth side face 7 is referred to as the length L of the component.

The first and the second side face 4, 5 are parallel to one another. The first side face 4 and the second side face 5 are each arranged perpendicularly to the top side 3 and the bottom side 2 as well as to the third side face 6 and to the fourth side face 7. The extent of the component from the first side face 4 to the second side face 5 is referred to as the width B of the component.

The inner electrodes of the component comprise first inner electrodes 10, second inner electrodes 11 and third inner electrodes 12. The first inner electrodes 10 are each in electrical contact with the first outer electrode 8. The second inner electrodes 11 are each in electrical contact with the second outer electrode 9. In each case a first inner electrode 10 and a second inner electrode 11 are arranged in a common layer in the stack construction. In this case, the first and the second inner electrode 10, 11 are not in contact with one another.

The third inner electrodes 12 are floating inner electrodes. Accordingly, the third inner electrodes 12 are not directly electrically connected to one of the outer electrodes 8, 9. In each case a third inner electrode 12 is arranged in an electrode layer which is adjacent to the electrode layer in which a first inner electrode 10 and a second inner electrode 11 are arranged.

In this case, the third inner electrode 12 overlaps with the first inner electrode 10 in a first overlap region 13. The third inner electrode 12 further overlaps with the second inner electrode 11 in a second overlap region 14. The two overlap regions 13, 14, in which inner electrodes that are adjacent to one another overlap with one another, form an active volume A of the component.

The active volume A of the component is not arranged centrally in the component. Rather, the active volume A is arranged in an upper region 15 of the component, which upper region is close to the top side 3, and in a lower region 16 of the component, which lower region is close to the bottom side 2. In this case, the active volume A is made up of partial volumes. A region 17, which is in the center in the vertical direction and is situated between the upper region and the lower region 16, is free of the active volume.

Since the active volume A of the component is therefore arranged close to the outer faces of the component, a change in temperature of the surrounding area very rapidly reaches the active volume A. Accordingly, that region of the component which is critical for the thermal time constant, specifically the active volume A, is very rapidly influenced by a change in the ambient temperature.

A change in temperature of the component does not take place homogeneously. Rather, in the event of a change in temperature, the temperature of the outer faces, i.e. the top and the bottom side 3, 2 as well as the side faces 4, 5, 6, 7, and those regions of the component that are situated close to the outer faces changes first. The change in temperature then gets ever more close to the interior of the component, until the entire component has adapted to the changed temperature. A change in the ambient temperature therefore always affects the upper and the lower region 15, 16 of the component first and only then the central region 17 of the component. The change in temperature of the component proceeds in the vertical direction from the outer regions, i.e. the upper and the lower region 15, 16, the temperature of which changes first, to the central region 17, the temperature of which changes somewhat later.

In the component shown in FIG. 1, the active volume A is therefore placed in the regions 15, 16 of the component that are affected by the change in temperature first. The electrical properties of the component are therefore very rapidly influenced by the change in temperature.

The component is symmetrical with respect to the plane of symmetry that is indicated by the dashed line. The components are often manufactured as bulk goods, wherein the manner in which the component is installed with respect to the top and bottom side 3, 2 is not predefined. Therefore, a symmetrical design of the component with respect to the plane of symmetry is advantageous.

Figure 2:
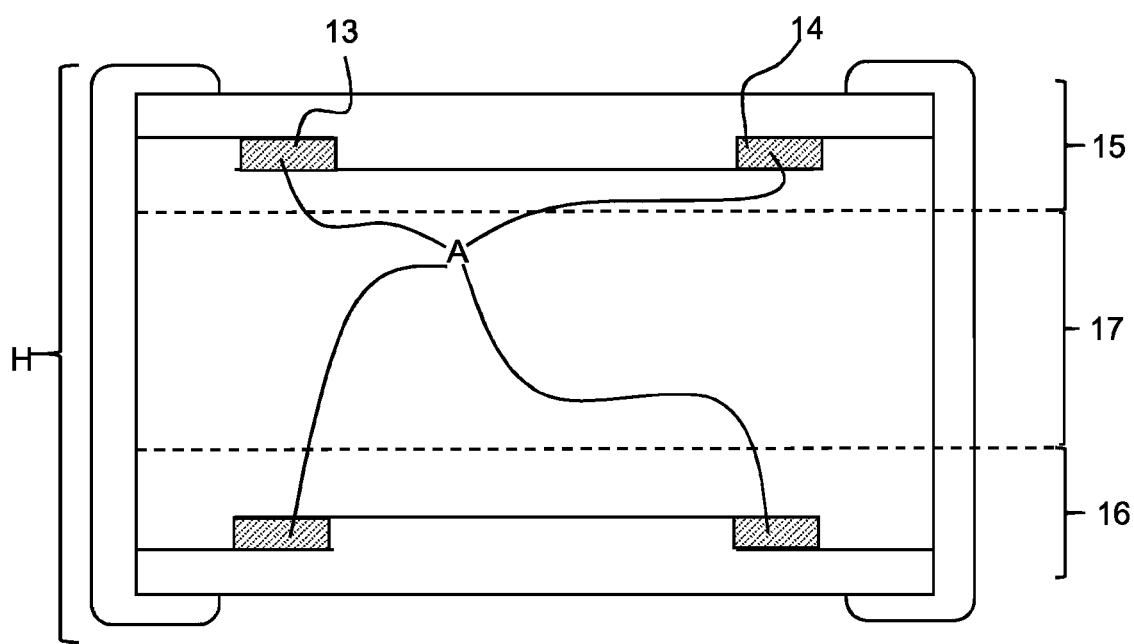
FIG. 2 shows the component from FIG. 1, wherein the regions in which the active volume can be arranged are indicated.

FIG. 2 shows the component shown in FIG. 1, wherein the lower region 16 and the upper region 15, in which the partial volumes of the active volume A are formed, and the active volume A are marked. The lower region 16 extends from the bottom side 2 as far as a height of at most 30% of the height H. The upper region 15 extends from the top side 3 as far as a height of at least 70% of the height H. The region 17, which is in the center in the vertical direction and is situated between these regions 15, 16, is free of the active volume A of the component. In the event of a change in the ambient temperature, the central region 17 is adapted to the changed ambient temperature last. Owing to the partial volumes of the active volume A being shifted into the lower and the upper region 16, 15 it can be possible to adapt the active volume A to the changed temperature particularly rapidly and in this way to cause, for example, a change in resistance of the component.

FIG. 3 shows a cross section through a component according to a second exemplary embodiment, wherein the cross section is cut perpendicularly to the stacking direction S. The cross section shows an electrode layer in which a first inner electrode 10 and a second inner electrode 11 are arranged.

The first inner electrode 10 has a first part 18 and a second part 19. A gap 20 is arranged between the first part 18 and the second part 19. The gap 20 extends in the longitudinal direction of the component. The gap 20 is therefore perpendicular to the outer electrodes 8, 9 and runs parallel to the first and to the second part 18, 19 of the first inner electrode 10. Accordingly, a region 21 that is in the center in the width direction is free of the first inner electrode. The second inner electrode 11 also has two parts which are separated by a gap 20. The region 21 that is in the center in the width direction is free of the second inner electrode 11. Accordingly, the first and the second inner electrode 10, 11 are therefore arranged in a left-hand-side region 22, which is close to the first side face 4, and in a right-hand-side region 23, which is close to the second side face 5. The component is free of inner electrodes in the region 21 which is in the center in the width direction and is far away both from the first side face 4 and from the second side face 5.

The change in temperature of the component does not proceed homogeneously in the width direction either. Rather, the temperature of the right-hand-side and of the left-hand-side region 23, 22 changes first and the temperature of the region 21 that is in the center in the width direction changes only somewhat later.

FIG. 4 shows a cross section perpendicular to the stacking direction S of a further electrode layer of the component according to the second exemplary embodiment, wherein the third inner electrode 12 is arranged in this layer. The third inner electrode 12 is a floating inner electrode which likewise consists of two parts. The two parts are separated from one another by a gap 20 which is arranged in the region 21 that is in the center in the width direction. The partial volumes which make up the active volume A of the component are therefore formed close to the first and, respectively, the second side face 4, 5 in the second exemplary embodiment. The region 21 which is in the center in the width direction and is far away from the first and the second side face 4, 5 does not contain the active volume A.

The first and the second exemplary embodiment can be combined with one another. Accordingly, the inner electrodes 10, 11, 12 shown in FIG. 1 can each be formed in two parts. As a result, active volumes A which are situated close to the top side 3 or the bottom side 2 and close to the first side face 4 or the second side face 5 can be created. A component in which the active volume A is particularly rapidly influenced by a change in the ambient temperature can be constructed in this way.

The concept described here is not restricted to components with floating inner electrodes. The active volume A could also be formed by overlapping between first inner electrodes 10, which are connected to a first outer electrode 8, and second inner electrodes 11, which are connected to a second outer electrode 9. In this case, the partial volumes of the active volume A can once again be arranged close to the outer faces of the component.

Figure 5:
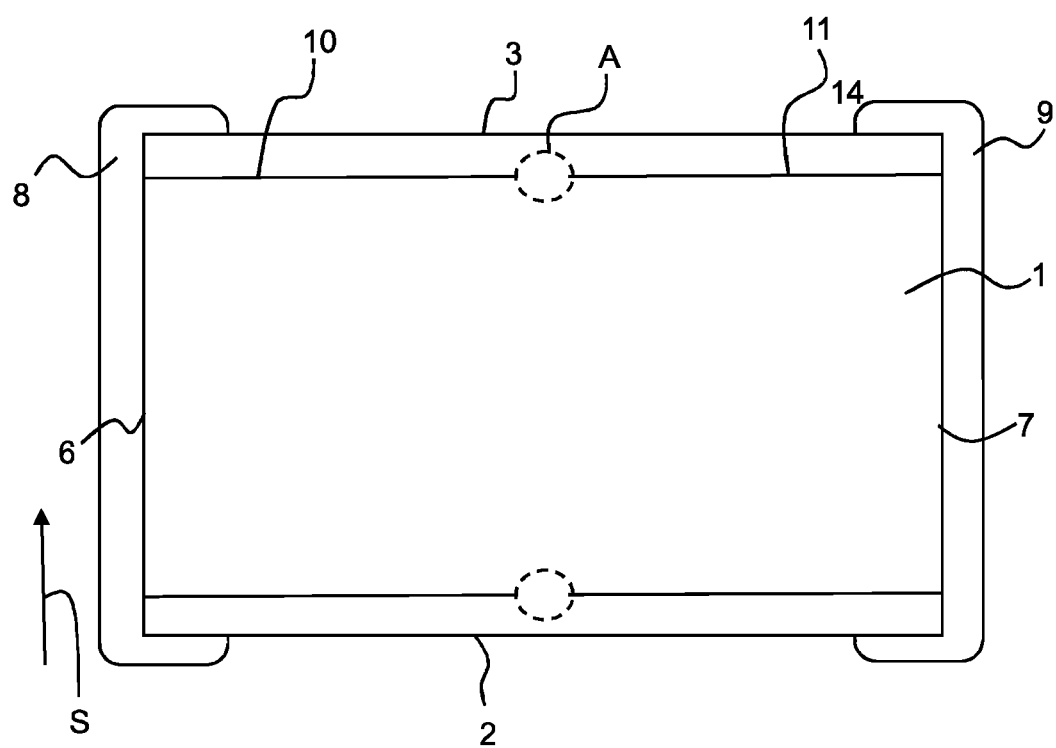
FIG. 5 shows a third exemplary embodiment of the component.

FIG. 5 shows a third exemplary embodiment. The third exemplary embodiment is based on the first exemplary embodiment, wherein there are no floating inner electrodes provided in the third exemplary embodiment of the component. The first inner electrode 10 is connected to the first outer electrode 8. The second inner electrode 11 is connected to the second outer electrode 9. A voltage can be applied between the first inner electrode 10 and the second inner electrode 11. The first inner electrode 10 and the second inner electrode 11 are arranged in the same plane and are not in contact with one another. Accordingly, an active volume A is formed in a region between the two inner electrodes. The active volume A is identified in FIG. 5. The inner electrodes 10, 11 and therefore the active volume are arranged close to the top side 3 of the component. A second partial volume of the active volume A is further formed close to the bottom side 2 of the component between two further inner electrodes which are likewise arranged in the same plane and are not in contact with one another. As in the first and the second exemplary embodiment, a change in temperature rapidly reaches the active volume on account of the arrangement of said active volume close to the outer sides.

LIST OF REFERENCE SIGNS

1 Ceramic material
2 Bottom side
3 Top side
4 First side face
5 Second side face
6 Third side face
7 Fourth side face
8 First outer electrode
9 Second outer electrode
10 First inner electrode
11 Second inner electrode
12 Third inner electrode
13 First overlap region
14 Second overlap region
15 Upper region
16 Lower region
17 Region in the center (in the vertical direction)
18 First part
19 Second part
20 Gap
21 Region in the center in the width direction
22 Left-hand-side region
23 Right-hand-side region
S Stacking direction
H Height
L Length
B Width
A Active volume

The invention claimed is:

1. A component, comprising:
a first side face;
a second side face, a width of the component extending from the first side face to the second side face of the component;
a bottom side;
a top side, a height of the component extending from the bottom side to the top side of the component;
a plurality of inner electrodes, at least a pair of inner electrodes in the plurality of electrodes configured to form an active volume of the component,
wherein the active volume is not arranged centrally over the width of the component,
wherein owing to the non-central arrangement of the active volume, a thermal time constant of the component is reduced,
wherein the active volume is formed either by
  (i) overlap regions of adjacent inner electrodes of opposite polarity, wherein inner electrodes that are adjacent to one another in a stacking direction overlap with one another in at least one overlap region and the active volume of the component is formed by the at least one overlap region of the inner electrodes, or
  (ii) a region which is situated between two inner electrodes of opposite polarity, wherein the two inner electrodes are arranged in the same plane and do not touch each other, wherein the region between the two inner electrodes forms the active volume of the component,
wherein the active volume is arranged in a left-hand-side region, which extends from the first side face as far as a width of not more than 30% of the width, and/or in a right-hand-side region, which extends from the second side face as far as a width of at least 70% of the width,
wherein, in the width direction, a central region, which is free of inner electrodes, is arranged between the left-hand-side region and the right-hand-side region and directly adjoins the left-hand-side region and the right-hand-side region in each case, and
wherein the component is a ceramic multilayer component.

2. The component according to claim 1,
wherein the active volume is arranged close to a side face of the component,
and/or wherein the active volume is arranged close to a bottom side of the component,
and/or
wherein the active volume is arranged close to a top side of the component.

3. The component according to claim 1,
wherein the active volume is arranged in a lower region between the bottom side and a height of 30% of the height and/or in an upper region between a height of 70% of the height and the top side.

4. The component according to claim 1, wherein at least one of the inner electrodes of the component is a floating electrode.

5. The component according to claim 1, wherein the active volume has a plurality of partial volumes which are arranged symmetrically.

6. The component according to claim 1, wherein at least one inner electrode has two parts which are separated from one another by a gap which runs perpendicularly to the height and to the width of the component.

7. The component according to claim 1, wherein the active volume makes up less than 30% of a total volume of the component.

8. The component according to claim 1,
wherein the component has an outer electrode which is arranged on a third side face of the component,
wherein at least one of the inner electrodes is connected to the outer electrode,
wherein the outer electrode partially overlaps the inner electrode that is connected to the outer electrode, and the inner electrode that is connected to the outer electrode projects beyond a region which is overlapped by the outer electrode.

9. The component according to claim 1,
wherein the component is configured for surface mounting.

10. The component according to claim 1,
wherein the component is a negative temperature coefficient (NTC) thermistor or a positive temperature coefficient (PTC) thermistor.

11. The component according to claim 1, wherein the component is a temperature measuring element.

12. The use of a component according to claim 1, for monitoring a temperature of a battery.

13. The use of a component according to claim 1, for monitoring a temperature in a vehicle.

14. A component, comprising:
a first side face;
a second side face, a width of the component extending from the first side face to the second side face of the component;
a bottom side;
a top side, a height of the component extending from the bottom side to the top side of the component;
a plurality of inner electrodes, at least a pair of inner electrodes in the plurality of electrodes configured to form an active volume of the component,
wherein the active volume of the component is not arranged centrally over the height of the component,
wherein the active volume is not arranged centrally over a width of the component,
wherein owing to the non-central arrangement of the active volume, a thermal time constant of the component is reduced,
wherein the active volume is formed either by
 (i) overlap regions of adjacent inner electrodes of opposite polarity, wherein inner electrodes that are adjacent to one another in a stacking direction overlap with one another in at least one overlap region and the active volume of the component is formed by the at least one overlap region of the inner electrodes, or
 (ii) a region which is situated between two inner electrodes of opposite polarity, wherein the two inner electrodes are arranged in the same plane and do not touch each other, wherein the region between the two inner electrodes forms the active volume of the component,
wherein the active volume is arranged in a left-hand-side region, which extends from the first side face as far as a width of not more than 30% of the width, and/or in a right-hand-side region, which extends from the second side face as far as a width of at least 70% of the width,
wherein, in the width direction, a central region, which is free of inner electrodes, is arranged between the left-hand-side region and the right-hand-side region and directly adjoins the left-hand-side region and the right-hand-side region in each case and
wherein the component is a ceramic multilayer component.

15. A component, comprising:
a first side face;
a second side face, a width of the component extending from the first side face to the second side face of the component;
a bottom side;
a top side, a height of the component extending from the bottom side to the top side of the component;
a plurality of inner electrodes, at least a pair of inner electrodes in the plurality of electrodes configured to form an active volume of the component;
a third side face which is covered by a first outer electrode; and
a fourth side face which is covered by a second outer electrode, a length of the component extending from the third side face to the fourth side face,
wherein the width, the length and the height of the component are perpendicular to each other,
wherein the active volume is not arranged centrally over a width of the component,
wherein owing to the non-central arrangement of the active volume, a thermal time constant of the component is reduced,
wherein the active volume is formed either by
 (i) overlap regions of adjacent inner electrodes of opposite polarity, wherein inner electrodes that are adjacent to one another in a stacking direction overlap with one another in at least one overlap region and the active volume of the component is formed by the at least one overlap region of the inner electrodes, or
 (ii) a region which is situated between two inner electrodes of opposite polarity, wherein the two inner electrodes are arranged in the same plane and do not touch each other, wherein the region between the two inner electrodes forms the active volume of the component, and
wherein the component is a ceramic multilayer component.

16. A component, comprising:
a first side face;

a second side face, a width of the component extending from the first side face to the second side face of the component;
a bottom side;
a top side, a height of the component extending from the bottom side to the top side of the component;
a plurality of inner electrodes, at least a pair of inner electrodes in the plurality of electrodes configured to form an active volume of the component a third side face which is covered by a first outer electrode; and
a fourth side face which is covered by a second outer electrode, a length of the component extending from the third side face to the fourth side face,
wherein the width, the length and the height of the component are perpendicular to each other,
wherein the active volume of the component is not arranged centrally over the height of the component,
wherein the active volume is not arranged centrally over a width of the component,
wherein owing to the non-central arrangement of the active volume, a thermal time constant of the component is reduced,
wherein the active volume is formed either by
(i) overlap regions of adjacent inner electrodes of opposite polarity, wherein inner electrodes that are adjacent to one another in a stacking direction overlap with one another in at least one overlap region and the active volume of the component is formed by the at least one overlap region of the inner electrodes, or
(ii) a region which is situated between two inner electrodes of opposite polarity, wherein the two inner electrodes are arranged in the same plane and do not touch each other, wherein the region between the two inner electrodes forms the active volume of the component, and
wherein the component is a ceramic multilayer component.

17. The component according to claim 1, wherein the component is a thermistor.

18. The component according to claim 14, wherein the component is a thermistor.

* * * * *

UNITED STATES PATENT AND TRADEMARK OFFICE
CERTIFICATE OF CORRECTION

| | |
|---|---|
| PATENT NO. | : 12,033,773 B2 |
| APPLICATION NO. | : 17/612337 |
| DATED | : July 9, 2024 |
| INVENTOR(S) | : Alfred Hofrichter |

It is certified that error appears in the above-identified patent and that said Letters Patent is hereby corrected as shown below:

In the Claims

At Column 11, Lines 9-10 (Claim 16, Lines 11-12), please delete "volume of the component a third side face which is covered" and insert --volume of the component; a third side face which is covered-- therefor.

Signed and Sealed this
Third Day of September, 2024

Katherine Kelly Vidal
Director of the United States Patent and Trademark Office